United States Patent
Watson

[15] 3,684,044
[45] Aug. 15, 1972

[54] QUADRILATERAL VEHICLE

[72] Inventor: Thomas A. Watson, 2720 Goyer Apt. 24, Montreal, 251, Quebec, Canada

[22] Filed: April 27, 1970

[21] Appl. No.: 32,136

[52] U.S. Cl. ........................... 180/5 R, 180/9.46
[51] Int. Cl. ...................... B62m 27/02, B62d 11/20
[58] Field of Search ....... 180/5 R, 5 A, 9.24, 9.46, 21

[56] References Cited

UNITED STATES PATENTS

| | | | |
|---|---|---|---|
| 645,272 | 3/1900 | Scheu | 180/21 |
| 2,067,546 | 1/1937 | Rocher | 180/21 |
| 2,846,017 | 8/1958 | Luchterhand | 180/5 |
| 3,455,405 | 7/1969 | Parent | 180/9.46 |
| 3,495,883 | 2/1970 | Fischbach | 180/9.46 X |

*Primary Examiner*—Richard J. Johnson

[57] ABSTRACT

In a vehicle having a single front and rear mounted driven and steerable wheel or track, 360° steering is possible by applying drive about its steering axes. The torque developed by this drive is balanced out in the steering system, hence preventing the vehicle from being difficult to steer in one direction and easy in the other direction. This vehicle is capable of turning about its own center and requires no differential. The system is particularly adaptable to a small snowmobile and will greatly enhance its steering, traction and braking characteristics. Two centrally mounted skis are placed on the vehicle in a quadrilateral fashion to provide lateral stability.

1 Claim, 29 Drawing Figures

PATENTED AUG 15 1972

*Thomas A. Watson*

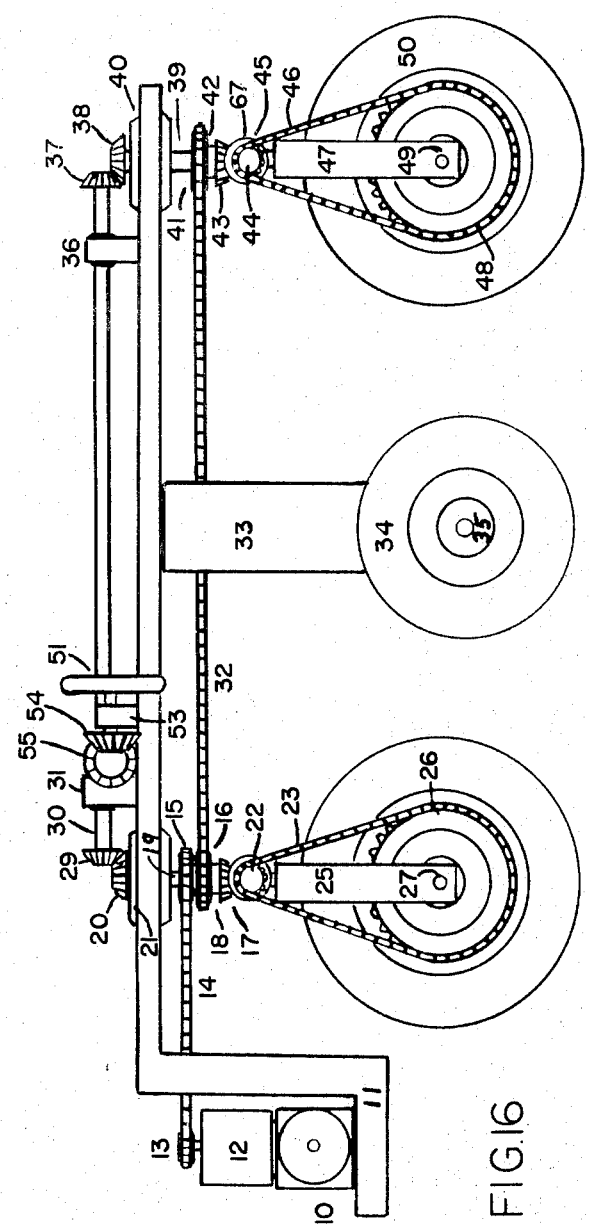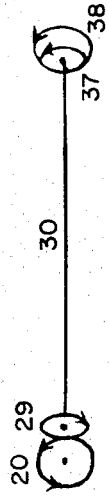

Thomas A Watson

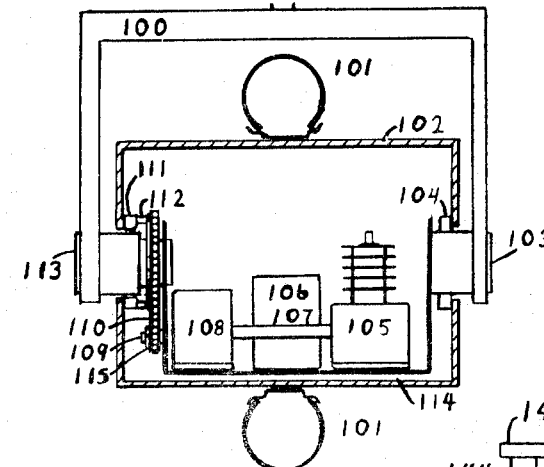
FIG 21
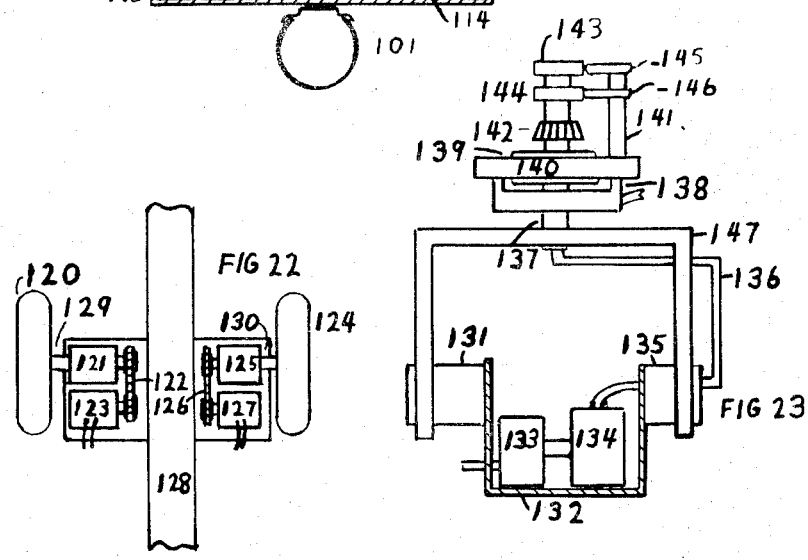
FIG 22
FIG 23
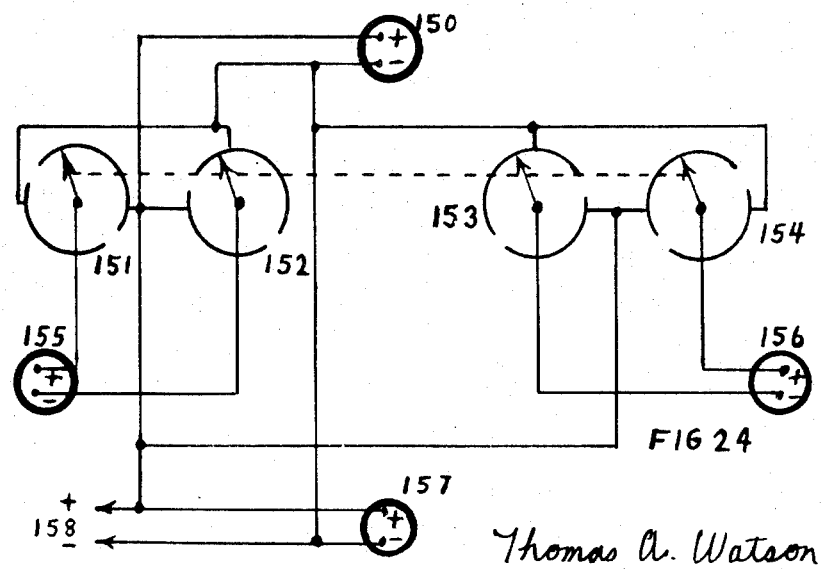
FIG 24
Thomas A. Watson

Thomas A. Watson

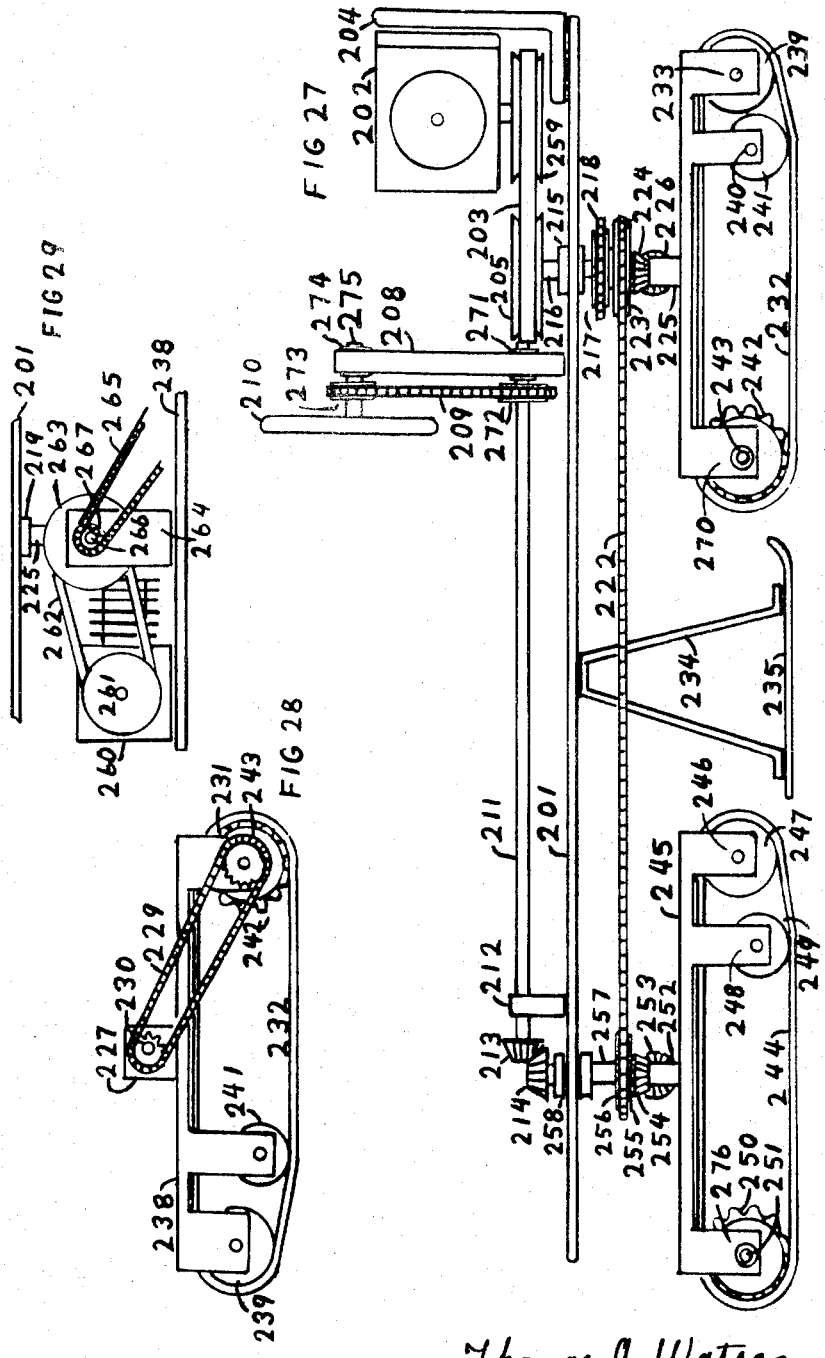

QUADRILATERAL VEHICLE

The invention relates to a means of steering and driving a four wheeled vehicle with two centrally located side wheels. On the center line running perpendicular to the axis of rotation of these side wheels at the front and rear of the vehicle is mounted a wheel. The front wheel and rear wheel are mounted an equal distance from the axis of the side wheels. The side wheels are independently free to rotate at different angular velocities with respect to each other, and are not driven or steered.

The front and rear wheels are steered through equal and opposite angles and always travel in the same circle or line, hence they always run at the same peripheral velocity. When the front and rear wheels are turned through 90° from their straight position the vehicle will turn about its own center, making it highly manuverable. If they are turned between 90° and 270° the vehicle will reverse without reversing the drive means. A perpendicular line drawn from each wheel always points to the same center hence satisfying conditions for proper steering.

Since both wheels always travel at the same peripheral velocity they can be driven from a single engine by means of a rigid drive system. Each wheel has a sprocket and is chain driven from another sprocket mounted near the vertical steering axis of the wheel. A right angle gear drive is coupled to this sprocket and is in turn driven by another chain and sprocket system, all of which rotate about a vertical axis. The drive system is such that each wheel may be rotated about its vertical axis for steering purposes. A turning moment occurs about this vertical axis causing the wheels to be turned about their steering axis. This reaction may be prevented by driving the steering system through a worm gear. Steering the vehicle in one direction would then be easy and in the other direction it would be difficult.

To overcome the steering difficulty each wheel may be driven by a separate motor mounted within the wheel itself. This eliminates the need of a separate drive system to each wheel. It makes the vehicle more compact and places a large portion of the weight over each of the driven wheels. The vehicle will obviously operate with only one engine improving its reliability. For small, low power vehicles this approach is practical, but not necessarily the most economical. Electric motors could replace the internal combustion engines mounted in the wheel.

The tendency for the wheels to steer themselves in one direction due to the drive system may be eliminated by providing the drive in such a manner that the front and rear wheels reaction is balanced out in the steering and drive system. The drive means is coupled to each wheel such that they will tend to steer in the same direction, however, the steering system is reverse coupled so that it steers the wheels in opposite directions. The end result is that the reaction of the front wheel is cancelled out by the rear wheel. If the drive system is not properly coupled to the wheels the reaction forces would add causing the vehicle to want to steer into one direction only.

Chain drive is shown but the system is also adaptable to shaft and gear drive.

By connecting an electrical motor to each wheel all four wheels may be driven. The front and rear wheels always travel at the same velocity with respect to each other whereas the side wheels travel at a variety of velocities with respect to each other and with respect to the front and rear wheels. In certain cases one side wheel may be stopped or may even go backwards with respect to the other side wheel. By employing traction type electric motors and controlling their direction of rotation the side wheels may also be powered for improved traction. A simple controller for stopping and reversing the electric motors is attached to the steering mechanism. A more complex system with speed as well as direction control could be developed.

In another version of the vehicle the front and rear wheels could be substituted for tracks. This would make a highly manoeuverable vehicle, particularly adaptable to the small size snowmobile market. In one version the tracks could be wide enough to provide lateral stability without the need for side wheels or skis. In another version, skis or wheels could be placed at the side of the vehicle to provide lateral stability. This arrangement is suitable for narrow snowmobiles. Vehicles with two tracks side by side normally require a greater width to achieve manoeuverability than this arrangement and are also less efficient when turning.

The objective of this invention is to provide a highly manoeuverable vehicle capable of turning about its own center. Another objective is to provide a vehicle in which no slippage can occur between driven wheels, thus providing good traction characteristics. Still another objective is to provide a drive and steering means for such a vehicle that balances out any reaction which could tend to make the vehicle difficult to steer. Another objective is to provide a vehicle which is capable of good performance on highways as well as on rugged terrain. Another objective is to make a compact vehicle by placing the motor and drive system in each wheel of the vehicle. Another objective is to show a drive system capable of driving all four wheels. Another objective is to provide a tracked Vehicle based upon the same concept, and particularly a highly manoeuverable small size snowmobile with good traction characteristics. Other objectives will become apparent in the detailed description which follows:

FIG. 16 is a side view of a vehicle employing the wheel locations as shown in FIG. 1.

FIG. 19 is a vector representation of the moments of force occurring at the front and rear wheels.

FIG. 20 is a vector representation of the forces developed in the steering system.

FIG. 21 shows a cross sectional front view of a motor mounted within a wheel.

FIG. 22 is a plan view showing motor drive means to the two side wheels.

FIG. 23 is a partial cross sectional front view of an electric motor mounted within a wheel.

FIG. 24 is a circuit diagram of the control means used to drive the wheels as shown in FIG. 22.

FIG. 27 is a side view of the vehicle shown in FIG. 25.

FIG. 28 is a partial side view of one of the track assemblies of the vehicle shown in FIG. 27.

FIG. 29 is a partial side view of a track assembly employing its own motor.

Figure 1:
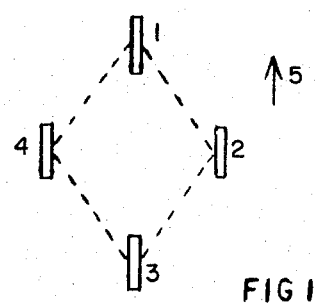
FIG. 1 shows the position of the vehicle's four wheels when travelling in a straight line.

FIG. 1 shows the position of front wheel 1, side wheels 2 and 4, and rear wheel 3. The distance between the centers of the wheels are equal such as the dashed line 1–2 equals 2–3 equals 3–4 equals 4–1. The arrow 5 shows the direction of the vehicle. All wheels travel at the same peripheral velocity.

Figure 2:
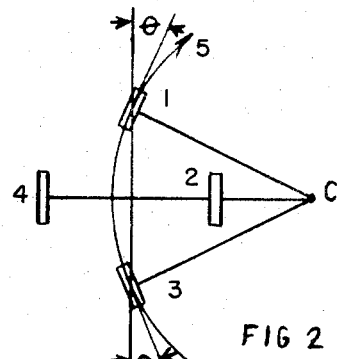
FIG. 2 shows the position of the four wheels when the vehicle is steered through an angle less than 90°.

FIG. 2 shows the wheels 1 and 3 turned through equal and opposite angles θ. All four wheels turn about the center C. Wheels 1 and 3 travel in direction 5 on a circle whose radius is C–1 or C–3 which are equal, hence the front and rear wheels travel at the same peripheral velocity.

Figure 3:
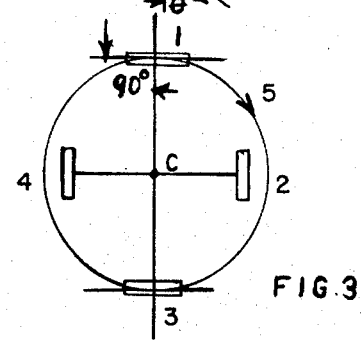
FIG. 3 shows the position of the wheels when they are steered through an angle of 90°.

FIG. 3 shows wheel 1 turned through 90° clockwise and wheel 3 through 90° anticlockwise. All wheels turn about center C. The distance C–1 and C–3 are equal, hence wheels 1 and 3 travel at the same peripheral velocity in direction 5. In this condition the vehicle will actually turn about its own center.

FIGS. 4 to 15 give a vector representation of the direction of travel of each wheel as a function of the angle through which wheels 1 and 3 are turned for steering purposes. Arrows 6 and 7 indicate the direction in which the wheels are steered. C represents the center about which the vehicle is turning.

Figure 4:
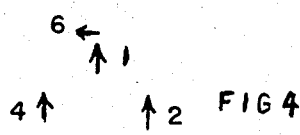
FIGS. 4 to 15 are a vector representation of the direction of motion of the four wheels at various steering angles.

FIG. 4 shows the vehicle going straight forward with all wheels travelling in the same direction at the same peripheral velocity.

Figure 5:
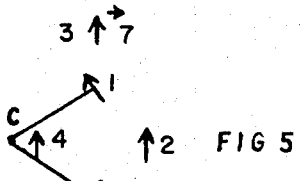

FIG. 5 shows the wheels 1 and 3 steered through less than 90°, with the center C outside the vehicle. Wheel 4 will travel relatively slow with respect to the other wheels.

Figure 6:
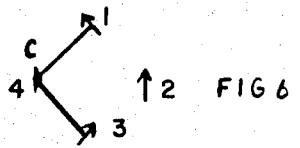

FIG. 6 shows the wheels steered through less than 90° but more than in FIG. 5, such that the center C is in the center of wheel 4, which becomes stationary.

Figure 7:
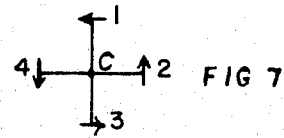

FIG. 7 shows the wheels 1 and 3 steered through 90° such that the center C is in the vehicles own center. Wheel 4 now travels in the opposite direction to wheel 2 but at the same peripheral velocity.

Figure 8:
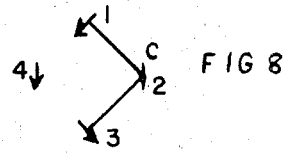

FIG. 8 shows the vehicle steered beyond 90° with the center C in the center of wheel 2, which becomes stationary.

Figure 9:
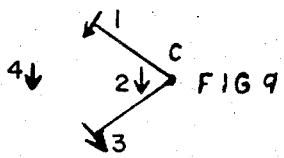

FIG. 9 shows the wheels steered through a greater angle than FIG. 8 such that the center C is outside the vehicle. Wheel 2 now reverses direction.

Figure 10:
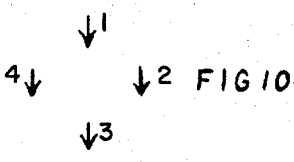

FIG. 10 shows the wheels 1 and 3 steered through 180° such that the vehicle goes backwards.

Figure 11:
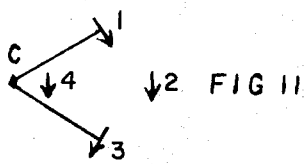

FIG. 11 shows the wheels steered through more than 180° such that point C is outside the vehicle.

Figure 12:
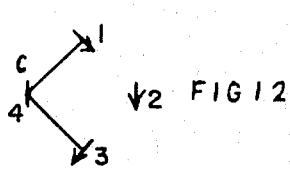

FIG. 12 shows the wheels steered through a greater angle than in FIG. 11 such that the center C is again in the center of wheel 4, which again becomes stationary.

Figure 13:
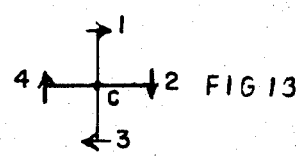

FIG. 13 shows the wheels steered through 270° with the center C again at the vehicle's center. The vehicle now turns about its own center, but in the opposite direction to that shown in FIG. 7. Also, wheel 4 now moves in the forward direction.

Figure 14:
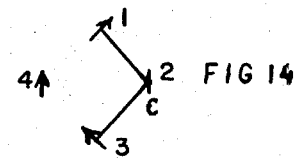

FIG. 14 shows the wheels steered through more than 270° such that the center C is located in the center of wheel 2, which again becomes stationary.

Figure 15:
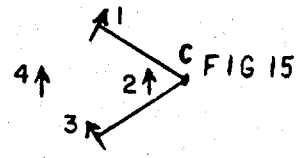

FIG. 15 shows the wheels 1 and 3 steered through an angle greater than that shown in FIG. 14 such that the center C is outside the vehicle. Wheel 2 now travels in the forward direction. When the wheels are steered through a complete 360° they will take up the positions as shown in FIG. 4.

Figure 17:
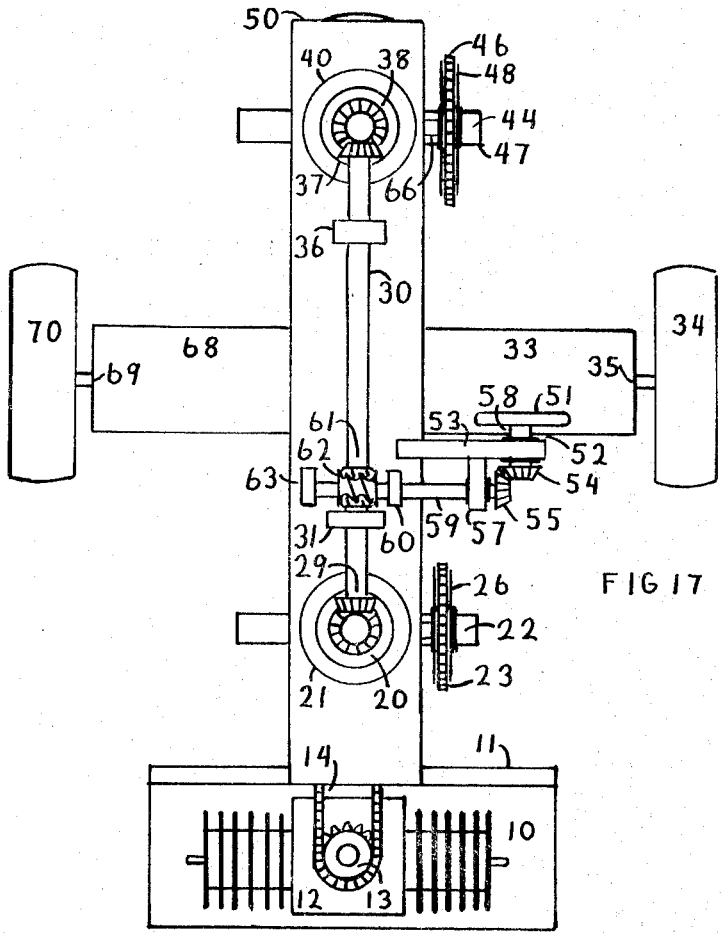
FIG. 17 is a plan view of the vehicle shown in FIG. 16.
Figure 18:
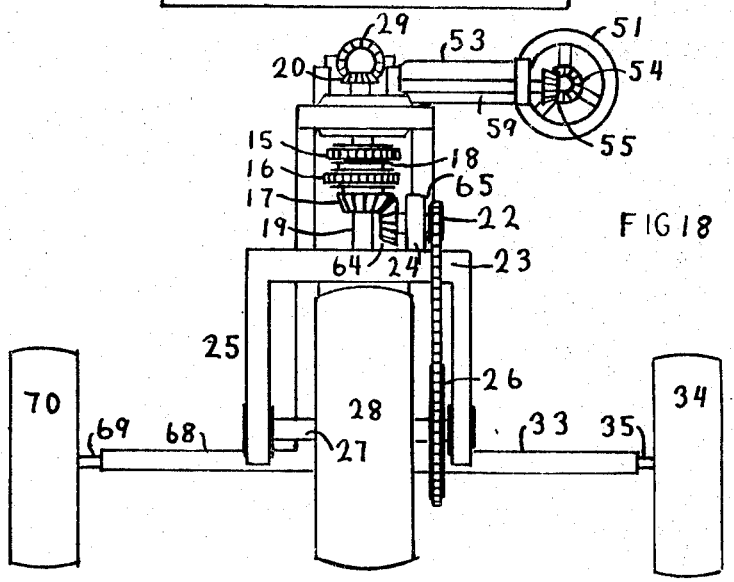
FIG. 18 is a front view of the vehicle shown in FIG. 16 taken along the line 18—18.
Figure 25:
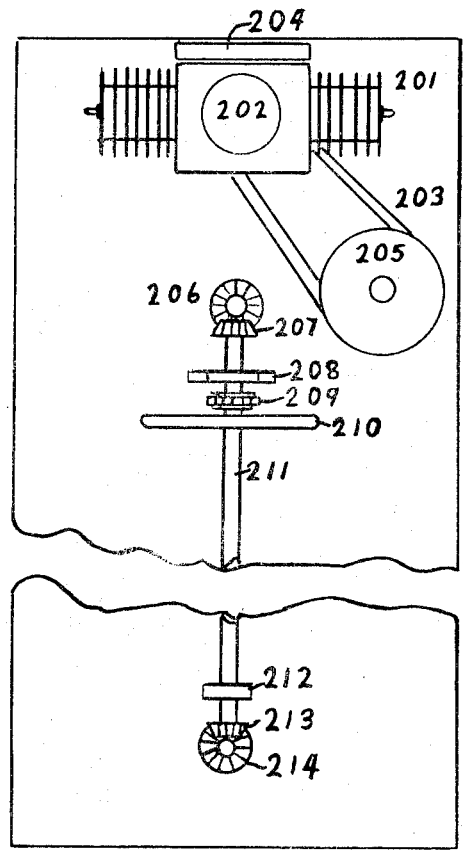
FIG. 25 is a partial plan view of a vehicle employing tracks instead of wheels.
Figure 26:
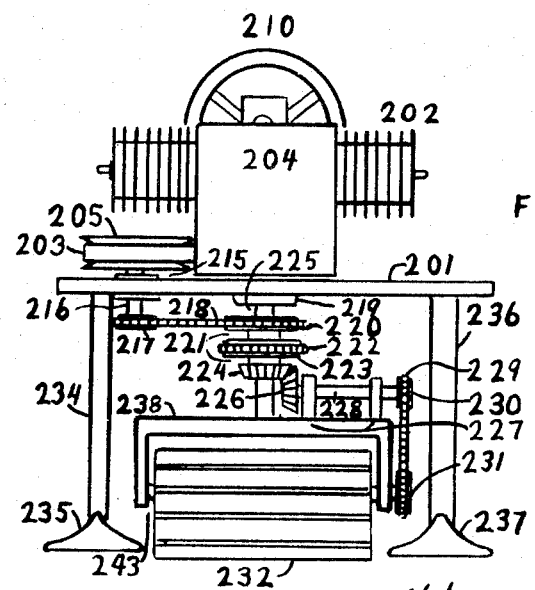
FIG. 26 is a front view of the vehicle shown in FIG. 25.

FIGS. 16, 17 and 18 show a vehicle employing the steering system as described in FIGS. 1 to 15. Both front and rear wheels are driven from a single motor at the same peripheral velocity and are steered through equal and opposite angles. The side wheels are free-wheeling.

A motor 10 is mounted on a frame 11. A transmission and clutch 12 are mounted on top of motor 10. A sprocket 13 is driven from transmission 12. A chain 14 passes through holes in frame 11, not shown, and is driven from sprocket 13 and drives sprocket 15. Sprockets 15 and 16 and bevel gear 17 are all fixed to hollow drive shaft and bearing arrangement 18 which rotates about steering shaft 19. Sprocket 15 drives sprocket 16 and gear 17 which inturn drives chain 32 and gear 64 respectively. Gear 64 drives shaft 65 which rotates in bearing 24 and in turn drives sprocket 22. Bearing 24 and shaft 19 are fixed to fork 25. Sprocket 22 drives chain 23 which in turn drives sprocket 26 attached to wheel and bearing 28, which rotates about axle 27 mounted in fork 25.

Chain 32 drives sprocket 41. Sprocket 41 and gear 43 are mounted on hollow drive shaft and bearing 42 which rotates about shaft 39. Gear 43 drives gear 67 which is mounted on shaft 66 which rotates in bearing 45 and drives sprocket 44. Bearing 45 and shaft 39 are mounted on fork 47. Sprocket 44 drives chain 46 which in turn drives sprocket 48 fixed to wheel and bearings 50, which rotates about axle 49 mounted in fork 47.

Gears 20 and 38 are attached to steering shafts 19 and 39 respectively. Shafts 19 and 39 turn in bearings 21 and 40 respectively. A shaft 30 which runs in bearings 31 and 36 fixed to frame 11, has gears 29 and 37 fixed to its end. Gear 29 drives gear 20 and gear 37 drives gear 38.

A steering wheel 51 is mounted on a shaft 48 running in bearing 52 mounted in support 53 fixed to frame 11. Shaft 58 drives gear 54 which in turn drives gear 55 fixed to shaft 59 running in bearing 57 mounted in support 53. Shaft 59 runs through bearings 60 and 63 mounted on frame 11. A worm gear 62 mounted on shaft 59 drives gear 61 fixed to shaft 30.

Support members 33 and 68 are attached to frame 11. A side wheel 34 rotates about axle 35 fixed to support member 33 and a side wheel 70 rotates about an axle 69 fixed to support member 68. Wheels 28 and 50 have a rigid drive system such that the rotation of either wheel will cause the other to move an equal amount provided the steering does not turn. The steering is prevented from turning due to wheel action, by the worm gear 62. The worm gear arrangement will not always be required, this is especially true on small vehicles. Since both wheels are rigidly coupled they will not slip with respect to each other. This will greatly improve their tractive ability as compared to a vehicle using a differential. Since the wheels 28 and 50 always travel on the same line or circle they will always travel at the same peripheral velocity, hence there is no need to use a differential.

As shown in FIG. 19 the drive system composed of chain 32 and sprockets 16 and 41 develop a moment which causes each wheel to tend to turn about its steering axis in the same direction, assisting steering in one direction but opposing it in the other. FIG. 20 shows the reaction on steering gears 20, 29, 37 and 38, gears 29 and 37 are coupled by shaft 30. Gear 20 tends to turn gear 29 in the opposite direction to that which gear 37 tends to be turned by gear 38. Since the gears 29 and 37 tend to turn the shaft 30 in opposite directions, a cancellation of forces occurs. This system allows the vehicle to be turned in either direction with the same steering effort. If the steering and drive system were not properly coupled, there would be a net reaction on the steering system, making it difficult to steer in one direction. Shafts and gears could replace the chain drive system shown.

FIG. 21 shows a hub mounted motor and wheel arrangement which could be employed to replace the front and rear wheels 28 and 50 and their associated drive system as shown in FIGS. 16 to 18.

To a fork 100, which would replace forks 25 or 47, of FIG. 16 are mounted hollow stub axles 103 and 113. Bearings 104 and 111 are mounted on drum 102 which rotates about the axles 103 and 113. A frame 114 is mounted to these axles. A motor 105, a fuel tank 106 and a transmission 108 are mounted to frame 114. A shaft 107 transmits power from the motor 105 to the transmission 108. A shaft 115 attached to transmission 108 protrudes through the frame 114. A sprocket 109 is fixed onto shaft 115. A chain 110 is driven by sprocket 109 and drives sprocket 112 attached to drum 102 through the casing of bearing 111. A wheel 101 is fixed to drum 102 which in turn is driven by sprocket 112. Controls may be brought out through the hollow axles 103 and 113, which also serve as ventilation ducts.

FIGS. 22, 23 and 24 show a system for electrically driving the front and rear wheels and also a system for powering the side wheels.

FIG. 22 shows a frame 128 to which is mounted electric motors 123 and 127 driving transmissions 121 and 125, through chain and sprocket drives 122 and 126 respectively. Side wheels 120 and 124 are mounted on stub axles 129 and 130, which are driven by transmissions 121 and 125 respectively.

FIG. 23 shows a method of hub-mounting an electric motor and connecting power cables such that the front and rear wheels of the vehicle may be continuously steered through 360°. The arrangement is similar to that shown in FIG. 21.

A frame 132 is suspended on stub hollow axles 131 and 135. An electric motor 134 and transmission 133 are mounted on the frame 132. Wires 136 for motor 134 pass through the hollow axle 135 and up through the hollow steering shaft 137 to the slip rings 143 and 144. Brushes 145 and 146 make contact with slip rings 143 and 144 respectively and are mounted on post 141 fixed to frame 140. The fork 147 is fixed to shaft 137 and in turn supports axles 131 and 135. Shaft 137 rotates in bearing 139 mounted to frame 140. Steering gear 142 is mounted on shaft 137. A controller 138 is mounted to frame 140 and is coupled to shaft 137.

FIG. 24 shows a circuit diagram for inter-connecting the four electric motors to the vehicle so as to provide drive to all four wheels. A motor 150 drives the front wheel, motors 155 and 156 the side wheels and motor 157 the rear wheel. Controllers 151 and 152 switch power to motor 155 and controllers 153 and 154 switch power to motor 156. All four controllers are ganged together and are mechanically coupled to the steering. FIG. 23 shows a controller 138 attached to the steering system, this controller is comprised of controllers 151, 152, 153 and 154.

Power is supplied by a source 158 which could be a diesel electric motor generator. Motors 150 and 157 are powered continuously while the vehicle is in motion. Motors 155 and 156 are powered in the forward or reverse direction depending upon the position of the controller. The diagrams shown in FIGS. 4 to 15 are used to determine the steering angles at which the side motors are switched. At certain steering angles one or the other side motors has its power removed.

FIGS. 25, 26, 27 and 28 show a tracked vehicle employing the steering and drive principles as shown in FIGS. 1 to 15, and 19 and 20. A motor 202 is mounted on a bracket 204 which is mounted on frame 201. A pulley 259 is attached to motor 202 and drives belt 203 which in turn drives pulley 205. Pulleys 259 and 205 and belt 203 form a clutch and automatic transmission.

Pulley 205 drives a shaft 216 which rotates in a bearing 215 mounted on platform 201. A sprocket 217 attached to shaft 216 drives chain 218 which in turn drives sprocket 220. Sprockets 220 and 223 and gear 224 are fixed to a hollow drive shaft and bearing 221 which rotates about steering shaft 225 which is fixed to frame 238. Gear 224 drives gear 226 fixed to shaft 228 which rotates in bearings 227 mounted on frame 238. A sprocket 230 is fixed to shaft 228 and drives chain 229 which in turn drives sprocket 231 mounted on shaft 243. Shaft 243 rotates in bearings 270 mounted in frame 238. Sprockets 242 are attached to shaft 243 and in turn drive the endless track 232. Bogey wheels 239 and 241 run on axles 233 and 240 respectively mounted on frame 238. Track 232 also travels over these bogey wheels.

The shaft 225 turns about bearing 219 mounted on frame 201. A gear 206 is fixed to shaft 225 and is driven by gear 207 fixed to shaft 211. Shaft 211 turns in bearing 271 mounted in upright 208 and bearing 212 mounted to platform 201. Upright 208 is mounted on platform 201. A steering wheel 210 drives a shaft 275 which rotates in bearing 274 mounted in upright 208. A sprocket 273 is attached to shaft 275 and drives chain 209 which in turn drives sprocket 272 mounted on shaft 211. Shaft 211 drives gear 213 which in turn drives gear 214 mounted to steering shaft 257. Shaft 257 rotates in bearing 258 mounted to platform 201. Frame 245 is attached to shaft 257.

Sprocket 223 drives chain 222 which in turn drives sprocket 256. Sprocket 256 and gear 254 are mounted on hollow drive shaft and bearing 255 which rotates about shaft 257. Gear 254 drives gear 253. 252 represents a drive system not shown but is identical to the one used on frame 238 at the front of the vehicle composed of elements 227, 228, 229, 230 and 231. Shaft 251 is driven by the equivalent of sprocket 231. Shaft 251 rotates in bearings 276 mounted in frame 245 and drives sprockets 250 which in turn drives the endless track 244. Track 244 travels over bogey wheels 247 and 249 mounted on axles 246 and 248 respectively. Axles 246 and 248 are mounted in frame 245.

A ski 235 is mounted on a bracket 234 fixed to frame 201, and a ski 237 is mounted on a bracket 236 also fixed to frame 201. These skis may be replaced by wheels as shown in FIG. 16. The skis would normally be short and wide. The sides and back of the skis could be flared upwards to assist in reversing and turning. The position of the wheels and skis in this arrangement with respect to the track is not as critical as with the four wheeled vehicle due to slippage. They should, however, be placed centrally between the tracks and as far out from the sides of the vehicle away from its longitudinal center line as possible.

FIG. 29 shows a motor 260 mounted on a frame 238 of FIG. 27 driving a pulley 261 which in turn drives a belt 262. Pulley 263 is driven by belt 262. Pulley 263 is mounted on shaft 266 running in bearing 264 mounted to frame 238. A sprocket 267 is attached to shaft 266 and drives a chain 265. Chain 265 would normally drive sprocket 231 of FIG. 28. The frame 238 is mounted to shaft 225 which rotates about bearing 219 mounted in platform 201. This motor drive system is placed on the front and rear frames 238 and 245 of FIG. 27, and replaces the motor 202 in its drive system.

The steering wheel 210 drives shaft 211 which steers the front and rear track assemblies to equal and opposite angles. The motor 202 and its associated drive means powers the front track assembly. Chain 222 transmits power from the front track assembly to the rear track assembly both tracks being driven at the same peripheral velocity. The side skis provide lateral stability and their use is dependent upon application and the width of the track. The drive and steering system has the same cancellation system for balancing out steering moments developed by the drive system as the vehicle shown in FIG. 16.

This arrangement is particularly adaptable to small snowmobiles. The system makes it possible to construct a narrow highly manoeuverable vehicle with better traction characteristics than conventional snowmobiles employing a single track and ski arrangement. Present small snowmobiles have limited manoeuverability except for those types employing two parallel tracks. These snowmobiles employing two parallel tracks are normally wider than a single track vehicle if they are required to be highly manoeuverable. Present two track vehicles are inefficient when turning due to track drag, whereas the concept presented here does not exhibit as much drag when executing a turn.

This arrangement is also adaptable to off road land vehicles capable of operation on rugged terrain and soft surfaces. It would normally use side wheels instead of skis for this purpose. The skis or side wheels could be replaced by a track. This track may be driven by the system shown in FIG. 22.

The arrangement with a motor mounted on each track assembly may be employed rather than the system using a single motor to drive both tracks. It is somewhat more expensive but provides additional reliability since the vehicle will operate on only one motor. The steering system turns the front and rear track assemblies through equal and opposite angles.

In general, the front and rear wheels or tracks form a traction means which is steered through equal and opposite angles. The front and rear traction means being normally driven at a constant peripheral velocity. The traction means are not necessarily restricted to wheels or tracks but could take other forms.

It should be noted that the drive shafts could be placed inside the steering shafts. This would somewhat change the construction of the vehicle but the results would be similar.

The embodiments of the invention in which an exclusive property or privilege is claimed are defined as follows:

I claim:

1. A vehicle comprising a frame having a first and a second track means with steering shafts steerably mounted on the frame about first and second vertical axes respectively, means connecting the two steering shafts for simultaneous steering in opposite directions, first and second vertical drive shafts coaxially mounted respectively with the two steering shafts for rotation about the steering axes and drivably connected to the track means, transmission means connecting the drive shafts for rotation in the same direction and means driving the transmission means, a first ski mounted to one side of the frame means, a second ski mounted to the other side of the frame means, said skis disposed underneath the frame means midway between the first and second track means.

* * * * *